(No Model.) 2 Sheets—Sheet 1.

C. D. DURNFORD.
PHOTOGRAPHIC SHUTTER.

No. 582,189. Patented May 11, 1897.

Witnesses
Geo. Wadman
J. K. Pauling

Inventor
Charles Day Durnford
by his Atty.
Edwin H. Brown

THE NORRIS PETERS CO., PHOTO-LITHO., WASHINGTON, D. C.

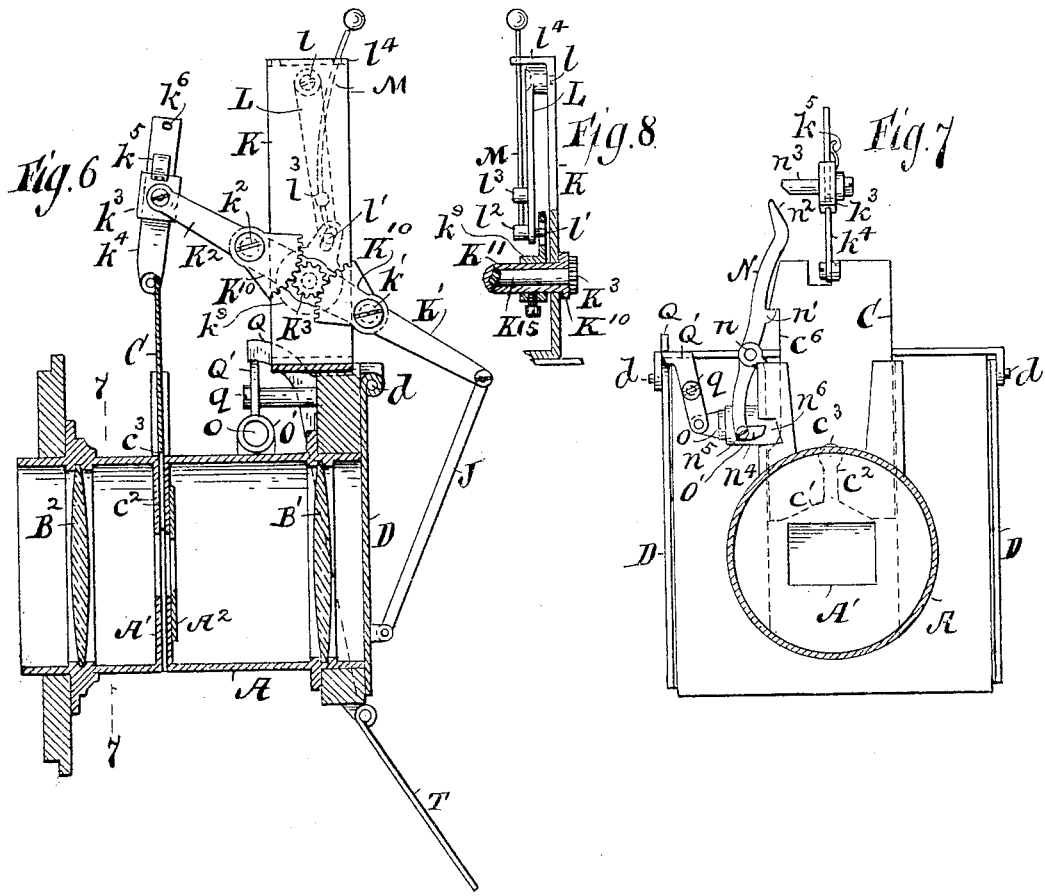

UNITED STATES PATENT OFFICE.

CHARLES DAY DURNFORD, OF LONDON, ENGLAND.

PHOTOGRAPHIC SHUTTER.

SPECIFICATION forming part of Letters Patent No. 582,189, dated May 11, 1897.

Application filed December 26, 1895. Serial No. 573,403. (No model.)

*To all whom it may concern:*

Be it known that I, CHARLES DAY DURNFORD, of London, England, have invented a certain new and useful Improvement in Photographing and Photographic Apparatus, of which the following is a specification.

The object of my improvement is to secure, as far as practicable, an exposure of all parts of a photographic plate, under the proper conditions, for producing a perfect photograph of all parts of a landscape or other object.

To this end my improvement consists in the combination, with a photographic camera, of a screen or diaphragm provided with an opening which varies in size during the exposure of a photographic plate, and a shield which moves in proper relation to the change of the opening in the screen or diaphragm, and thereby shields the lens variably, so that the light-rays may from time to time operate to the best effect.

I will describe a mechanism embodying my improvement, and then point out the novel features in claims.

Figure 1:
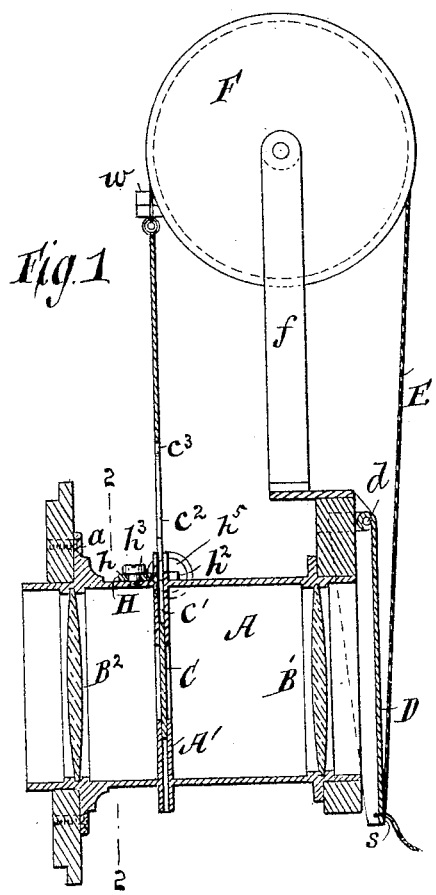
Figure 2:
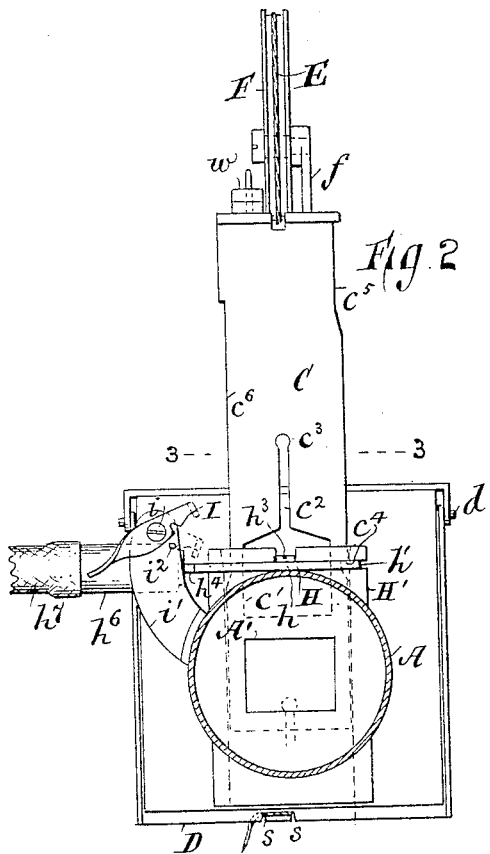
Figure 3:
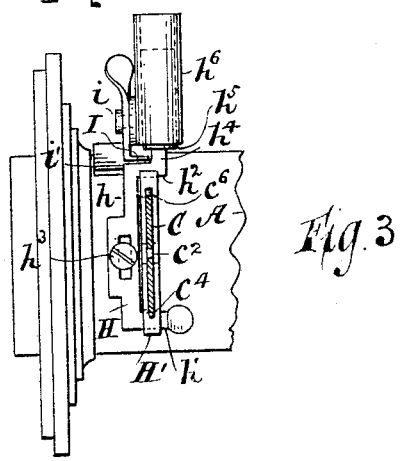
Figures 4, 5:
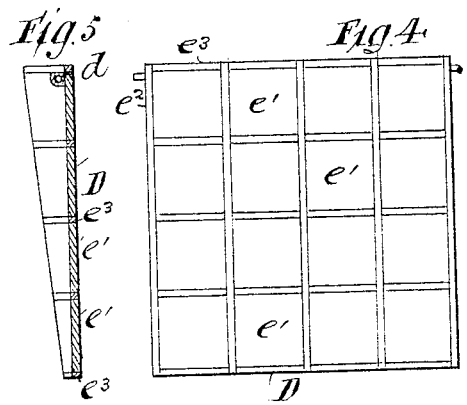

In the accompanying drawings, Figure 1 is a central longitudinal section of a lens-tube having combined with it apparatus embodying my improvement. Fig. 2 is a transverse section taken at the plane of the dotted line 2 2, Fig. 1, and looking toward the front of the lens-tube. Fig. 3 is a horizontal section taken at the plane of the dotted line 3 3, Fig. 2. Fig. 4 is a front view of a shield comprised in my improvement. Fig. 5 is a vertical transverse section of the same. Fig. 6 is a central vertical section of a lens-tube. Fig. 7 is a transverse section of a lens-tube and a back view of parts connected thereto, the section being taken at the plane of the dotted line 7 7, Fig. 6. Fig. 8 is a side view and partial section of certain parts. Fig. 9 is a horizontal section of certain parts.

Similar letters of reference designate corresponding parts in all the figures.

In Figs. 1, 2, and 3, A designates a lens-tube which may be of any suitable form. As here shown, it is of the double combination rectilinear type, fitted with lenses $B'$ $B^2$. The lens-tube may be fastened in any suitable way to a camera-body—as, for instance, by means of a screw-thread $a$.

C designates a screen or diaphragm intersecting the lens-tube intermediate the two lenses. As shown, it is made in the form of a plate and fitted to a slideway formed in a partition $A'$, with which the lens-tube is provided. It has a variable opening, the lower part of which $c'$ is quite large, an upper part $c^2$ of which is considerably smaller, and the uppermost part $c^3$ of which is larger than the part $c^2$. With the parts arranged and combined as in this example of my improvement this screen or diaphragm will during the taking of a picture be moved so that first the largest part $c'$ of its opening will come opposite the opening in the partition $A'$, that subsequently the narrow portion $c^2$ will come opposite said opening in the partition, and that finally the part $c^3$ will come opposite the said opening in the partition. In this way light will be admitted appropriately for different portions of a picture.

D designates a shield, which may be made in the form of a hood, pivoted by a pin $d$ to an appurtenance of the lens-tube, so as to be capable of rocking up and down. Normally it will occupy the position shown in Fig. 1, so as to be close to the outer end of the lens-tube. Thus it will cut off or reduce the amount of light passing to the same. It is intended that during the taking of a picture this shield shall be adjusted so as to admit light variably for different portions.

The screen or diaphragm and shield are intended to work in certain relation to each other. Because of this they may advantageously be connected together, and so in this example of my improvement I have shown a cord E as connected to the outer end of the shield and as also connected to the screen. In the present instance this cord passes over a pulley F, supported by a post $f$, extending upwardly from the lens-tube. The cord may be fastened to the pulley, so that it will be unable to slip. Obviously two cords connecting the screen or diaphragm and the shield separately to the pulley would be the equivalent of one cord, and such two cords might operate over surfaces located at different distances from the axis of the pulley, and these surfaces might even be cam-shaped. It is of great importance, in order to produce the best results, to provide for an adjustable connection for the shield. A simple way of accomplishing this is to connect the cord E adjustably with the shield through a V-shaped clasp or notch $s$, in which it will wedge and be gripped. This clasp may be made by suitably notching the lower edge of the shield.

The screen or diaphragm and shield are so combined that normally the lower imperforate part of the screen or diaphragm will be opposite the opening in the partition $A'$ of the lens-tube and the shield closed or practically closed against the outer end of the lens-tube. When a picture is to be taken, the screen will be moved downwardly so as to first bring the wide portion $c'$ of its opening opposite the opening in the partition $A'$. When this happens, the shield will be partly raised. Through the continued downward motion of the screen or diaphragm the narrow part $c^2$ of its opening will be brought opposite the opening in the partition $A'$, and at this time the shield will be raised higher. The continued downward movement of the screen or diaphragm will bring its portion $c^3$ opposite the opening in the partition $A'$ and raise the shield still higher. The screen or diaphragm may continuously move down to such position that its upper imperforate portion will close the opening in the partition $A'$, or the screen or diaphragm may be allowed to pause for an instant in its downward movement while the portion $c^3$ of its opening is opposite the opening in the partition $A'$. It is immaterial whether the larger or smaller part of the opening in the screen or diaphragm shall first move opposite the opening in the partition $A'$ of the lens-tube, provided that the relation of action between the screen or diaphragm and shield be maintained suitably.

Any suitable means may be provided for operating the screen or diaphragm and shield. For instance, the weight of the shield may hold it closed while the diaphragm is supported, and the latter may by its own weight, when released, descend and raise the shield. Weights $w$ may be added to the diaphragm to secure this operation.

A detent H is shown as fitted to slide upon the top of the lens-tube. As shown, it consists of a bar having a straight body portion $h$ and transversely-bent portions or arms $h'$ $h^2$, which embrace the screen or diaphragm C. The screen or diaphragm has a short notch $c^4$ in one of its edges and a long notch $c^5$ in the same edge, considerably higher up. In the opposite edge it has a long notch $c^6$. Obviously when this detent is in the position in which it is illustrated in the drawings its arm $h'$ will engage with the notch $c^4$ and support the diaphragm. Owing to the notch $c^6$ being extended down to a point opposite the notch $c^4$, the arm $h^2$ of the detent will not contact with the diaphragm. When it is desired to release the diaphragm, the detent will be moved, so that its arm $h^2$ will enter the notch $c^6$ and its arm $h'$ will leave the notch $c^4$. Then the diaphragm will descend until the top of its notch $c^6$ will rest upon the arm $h^2$ of the detent. As then the notch $c^5$ will be opposite the arm $h'$ of the detent, provision will be afforded for reversing the detent, so as to disengage its arm $h^2$ from the top of the notch $c^6$ of the diaphragm. Thus the diaphragm may be permitted to descend again until the top of its notch $c^5$ will rest upon the arm $h'$ of the detent.

Any suitable means may be employed for operating the detent. In the present instance its main or body portion $h$ is longitudinally slotted and fastened to the lens-tube by means of a screw $h^3$, extending through the slot and engaging with said lens-tube, and the arm $h^2$ is provided with a shank $h^4$, that is connected with a piston $h^5$, fitting in a cylinder $h^6$. The latter may be connected by a rubber tube $h^7$ with an ordinary pressure-bulb such as is commonly used in connection with detents.

If the diaphragm is lowered as described, there will be a pause before the exposure is completed. If it is not desired to stop the diaphragm during its descent by means of the notch $c^6$, I may use a catch I for limiting the motion of the piston $h^5$. This catch is shown as made in the form of a lever pivoted at $i$ to an arm $i'$, extending from the lens-tube and having a hooked end capable of being projected opposite the end of the piston to limit its outward movement, and hence the corresponding movement of the detent H. This lever is shown as having a notch for engaging with a pin $i^2$ to limit its movement.

In Figs. 4 and 5 I have shown a shield made of rectangular pieces of cork $e'$, connected by cross-pieces $e^2$ $e^3$ of cane, all being united by glue or similar substance. In this way I am enabled to make a very light shield which will not be liable to warp.

In Figs. 6, 7, 8, and 9 I have shown a lens-tube similar to that already described, except that in addition to its partition $A'$ it has a slot for receiving any one of a series of extra plates $A^2$, provided with central openings of different sizes. The diaphragm in this example of my invention is normally raised entirely above the opening of the partition $A'$, and consequently of the opening in the partition $A^2$ when this partition is used. It has a notch $c'$ at the lower end. This corresponds to the larger portion $c'$ of the opening in the diaphragm comprised in the first example of my invention. Above this portion $c'$ of the opening is a narrow portion $c^2$ and above that a wider portion $c^3$. The shield D is pivotally connected in place by a pin $d$ and at the lower portion is pivoted to one end of a rod J, whose other end is connected to a lever K'. The lever K' is fulcrumed on a pin or screw $k'$, which is connected to one of the arms of a three-arm lever $K^{10}$, that is fulcrumed to a post K, erected on the lens-tube. A similar lever $K^2$ is fulcrumed by a pin or screw $k^2$ to another of the arms of the said three-arm lever $K^{10}$. This lever $K^2$ is combined with the diaphragm by being pivotally connected to a slide $k^3$, that is fitted to a rod $k^4$, whose lower end is pivotally connected to the upper end of the diaphragm. A spring $k^5$ is connected to the slide $k^3$ and pressed against the rod $k^4$. A hole $k^6$ on the rod $k^4$ may serve to attach a cord to raise the screen for use. Normally the slide occupies a position some considerable distance above the lower end of the rod $k^4$. The frictional engagement of the slide and its spring with the rod is such that the slide and spring may slide down the rod without forcing down the diaphragm, provision thus being afforded for lost motion between the lever $K^2$ and the diaphragm.

The levers $K'$ $K^2$ are provided on their adjacent ends with toothed segments which engage with an intermediate pinion $K^3$, that is mounted upon a shaft $K^{15}$ within the three-arm lever $K^{10}$ coincidently with its fulcrum. Obviously by rotating this pinion both the levers $K'$ $K^2$ will be oscillated, so as to raise that arm of the lever $K'$ which is connected with the shield D and lower that arm of the lever $K^2$ which is connected with the rod $k^4$ of the diaphragm. Thus the relation of the levers may be changed and an adjustable connection between them afforded as a means of varying the relations of the shield and diaphragm. The three-arm lever $K^{10}$ has a sleeve $K^{11}$ forming its fulcrum and fitted to the post K. At one end of the sleeve $K^{11}$ is a head $K^{12}$, to which is affixed a spring $K^{13}$, whose free end is capable of engaging with any one of a number of recesses formed in a head $K^{14}$. This head $K^{14}$ is affixed to a shaft $K^{15}$, passing through the sleeve $K^{11}$ and having the pinion $K^3$ affixed to its forward end. By disengaging the detent and turning the head $K^{14}$ a different relation of the levers $K'$ $K^2$ to the lever $K^{10}$ may be obtained. The levers $K'$ $K^2$ $K^{10}$ may be regarded as a single lever having adjustable arms, for in operation all these parts work as a single lever.

To the post K an arm L is pivotally connected at the upper end by means of a pin or screw $l$, passing freely through the arm and engaging with the post. The lower end of this arm has a pin $l'$, that engages with a slot in one of the arms of the three-arm lever $K^{10}$, this arm being formed integral with a collar $k^9$, which is fastened to the sleeve $K^{11}$, to which is locked the shaft with the pinion $K^3$. Another pin $l^2$ extends from the lower portion of the arm L. A spring M passes through the pin $l^2$ and also through a pin $l^3$, that extends from the arm L above the pin $l^2$. At the upper end it may be engaged with either of two notches which are provided near the ends of a flange $l^4$ at the top of a post K. By bending the spring and engaging it with one of the notches it will be given a tendency to move the pinion in one direction, and hence to oscillate the lever composed of the levers $K'$ $K^2$ $K^{10}$ whenever the diaphragm shall be released.

A detent N, consisting of a lever fulcrumed at $n$ to an appurtenance of the lens-tube, is provided near its upper end with a projection $n'$ for engaging with a notch $c^6$ in the diaphragm. The upper end of the lever N is bent so as to prevent an inclined surface $n^2$, which may be operated upon by a cam $n^3$, that is carried by the slide $k^3$. Hence when the lever $K^2$ is oscillated so as to depress the slide the latter will, before coming in contact with the top of the diaphragm, shift the detent-lever N so as to disengage its projection $n'$ from the notch $c^6$ of the diaphragm and allow the diaphragm to descend, or by further movement push the diaphragm downward. The lever N is shown as provided with a detachable or adjustable projection $n^4$, which is secured in place by means of a screw $n^5$. When used, it will project through a notch $n^6$, formed in one of the slideways for the diaphragm C, and thus obtrude itself in the way of the top of the notch $c^6$ of the diaphragm.

The detent-lever N is set by hand, and after its projection $n^4$ shall have caught the diaphragm C, assuming that this projection $n^4$ is used, the detent-lever will have to be oscillated into or toward its original position by hand to release the diaphragm C and permit it to descend to its final position.

Normally the shield D will be locked in its closed position by means of an arm Q, with which it is provided, extending over a catch Q', which is made in the form of a lever, fulcrumed between its ends by a pin or screw $q$ to an appurtenance of the lens-tube and connected at one of its ends to a piston O, that works in a cylinder O'. The piston may be operated by means of an ordinary pressure-bulb. By forcing the piston outward the catch Q' will be withdrawn beyond the arm Q, whereupon the spring M will be free to rock the lever composed of the three-arm lever $K^{10}$ and the levers $K'$ $K^2$, suitably for opening the shield D and lowering the diaphragm C.

T is a supplementary shield, operated by hand in harmony with the shield D. Both shields may be rotated at the edges to make them strain the light.

What I claim as my invention, and desire to secure by Letters Patent, is—

1. The combination with a photographic camera, of a screen or diaphragm provided with an opening which varies the admission of light during the exposure of a photographic plate, and a shield which moves in proper relation to the change of the opening in the screen or diaphragm, and thereby shields the lens variably so that the light-rays may from time to time operate to the best effect, substantially as specified.

2. The combination with a photographic camera, of a screen or diaphragm provided with an opening adapted to vary the admission of light during exposure, a shield moving in relation to the lens-tube, and connections between said shield and the said screen or diaphragm, substantially as specified.

3. The combination with a photographic camera, of a screen or diaphragm provided with an opening adapted to vary the admission of light during exposure, shields moving in relation to the lens-tube, and means whereby the said screen or diaphragm and the said shields will be operated in proper relation to each other for effecting an exposure suitable for different parts of a picture, substantially as specified.

4. The combination with a photographic camera, of a screen or diaphragm provided with an opening adapted to vary the admission of light during exposure, shields moving in relation to the lens-tube, means whereby the said screen or diaphragm and the said shields will be operated in proper relation to each other for effecting an exposure suitable for different parts of a picture, and fringe on the edges of one or more of the shields, substantially as specified.

5. The combination with a photographic camera, of a screen or diaphragm provided with an opening adapted to vary the admission of light during the exposure of a photographic plate, and a shield moving in proper relation to the change of the opening in the screen or diaphragm, and an adjustable connection for the shield, substantially as specified.

In testimony whereof I have signed my name to this specification in the presence of two subscribing witnesses.

CHARLES DAY DURNFORD.

Witnesses:
   ANTHONY GREF,
   WALTER A. PAULING.